US011550078B2

(12) United States Patent
Qi et al.

(10) Patent No.: US 11,550,078 B2
(45) Date of Patent: Jan. 10, 2023

(54) GPU-BASED HUMAN BODY MICROWAVE ECHO SIMULATION METHOD AND SYSTEM

(71) Applicants: CHINA COMMUNICATION TECHNOLOGY CO., LTD., Shenzhen (CN); SHENZHEN INSTITUTE OF TERAHERTZ TECHNOLOGY AND INNOVATION, Shenzhen (CN)

(72) Inventors: Chunchao Qi, Shenzhen (CN); Aixian Wang, Shenzhen (CN); Hanjiang Chen, Shenzhen (CN); Xiongwei Huang, Shenzhen (CN); Yanli Liu, Shenzhen (CN); Chengyan Jia, Shenzhen (CN); Shukai Zhao, Shenzhen (CN)

(73) Assignees: CHINA COMMUNICATTON TECHNOLOGY CO. LTD., Shenzhen (CN); SHENZHEN INSTITUTE OF TERAHERTZ TECHNOLOGY AND INNOVATION, Shenzhen (CN)

( * ) Notice: Subject to any disclaimer, the term of this patent is extended or adjusted under 35 U.S.C. 154(b) by 946 days.

(21) Appl. No.: 16/340,332

(22) PCT Filed: Aug. 4, 2017

(86) PCT No.: PCT/CN2017/096100
§ 371 (c)(1),
(2) Date: Apr. 8, 2019

(87) PCT Pub. No.: WO2018/064917
PCT Pub. Date: Apr. 12, 2018

(65) Prior Publication Data
US 2020/0041691 A1    Feb. 6, 2020

(30) Foreign Application Priority Data
Oct. 9, 2016    (CN) .................... 201610882825.X

(51) Int. Cl.
*G06N 3/00*    (2006.01)
*G01V 13/00*    (2006.01)
(Continued)

(52) U.S. Cl.
CPC .............. *G01V 13/00* (2013.01); *G01V 8/005* (2013.01); *G01V 8/10* (2013.01); *G06N 3/004* (2013.01)

(58) Field of Classification Search
CPC .......... G01V 13/00; G01V 8/005; G01V 8/10; G01V 3/12; G06N 3/004
See application file for complete search history.

(56) References Cited

U.S. PATENT DOCUMENTS 7,880,671 B2    2/2011    Lee et al.
2010/0066595 A1    3/2010    Lee et al.

FOREIGN PATENT DOCUMENTS

CN    101199428    6/2008
CN    101859341    10/2010
(Continued)

OTHER PUBLICATIONS

Nimalan "Use of Multi-GPU Systems for Large FFTs: With Applications in Ultrasound Simulations", Australian National University, Feb. 2013, p. 1-104 (Year: 2013).*
(Continued)

*Primary Examiner* — David P Porta
*Assistant Examiner* — Mamadou Faye
(74) *Attorney, Agent, or Firm* — Maier & Maier, PLLC

(57) ABSTRACT

A GPU-based human body microwave echo simulation method includes: transmitting emulation input parameters from the memory of a CPU host into the display memory of a GPU device; configuring, at the CPU host, parallel computing network parameters to be run at the GPU device; initiating a kernel function for human body microwave echo (Continued)

simulation preset in the CPU host; computing the kernel function in parallel, in a plurality of processing kernels of the GPU device, in a multi-threaded manner, according to the parallel computing network parameters, to obtain simulation echoes of human body microwaves; transmitting the obtained simulation echoes of human body microwaves from the GPU device back to the CPU host. The method makes full use of the characteristic that a GPU can perform parallel computing to accelerate the echo simulation process, greatly improving the real-time performance of echo simulation of a human body microwave scanning and imaging system.

12 Claims, 5 Drawing Sheets

(51) Int. Cl.
*G01V 8/00* (2006.01)
*G01V 8/10* (2006.01)

(56) References Cited

FOREIGN PATENT DOCUMENTS

| CN | 102788979 | 11/2012 | |
|---|---|---|---|
| CN | 104688273 | 6/2015 | |
| CN | 106646664 | 5/2017 | |
| WO | WO-2017105566 A1 * | 6/2017 | ........... G01S 13/003 |

OTHER PUBLICATIONS

Michael et al. "Parallel Computing Experiences with CUDA", IEEE Computer Society 2008, p. 13-27. (Year: 2008).*

* cited by examiner

GPU-BASED HUMAN BODY MICROWAVE ECHO SIMULATION METHOD AND SYSTEM

CROSS-REFERENCE TO RELATED APPLICATIONS

This application is a national stage entry under 35 U.S.C. 371 of PCT Patent Application No. PCT/CN2017/096100, filed Aug. 4, 2017, which claims priority to Chinese Patent Application No. 201610882825.X, filed Oct. 9, 2016, the entire contents of each of each is incorporated herein by reference.

TECHNICAL FIELD

Embodiments of the present disclosure relate to the technical field of echo simulation, and more particularly, to a Graphics Processing Unit (GPU)-based human body microwave echo simulation method and system.

BACKGROUND

In recent years, microwave, millimeter wave or terahertz wave based near-distance human body three-dimensional scanning and imaging security inspect system, due to the advantages of penetrating human body's clothes, low radiation dose, and identifying metallic or non-metallic prohibited goods hidden by human body, has attracted the public attention and is highly regarded by organizations and institutions that need security inspection, such as airports, courts, prisons. During the development and the test phases of a human body three-dimensional scanning and imaging security inspect system, usually echo simulations are generated to support the links of system parameter verification and analysis, system imaging mechanism study, imaging algorithm design and verification. However, in a human body three-dimensional scanning and imaging system, the echo has a high dimension, and the system has a lot of channels, which cause heavy computing burden and high complexity in echo simulation. As a result, simulation echoes usually cannot be computed and generated in real time by existing conventional computers or CPU (Central Processing Unit) of a workstation.

SUMMARY

The embodiments of the present disclosure aim to provide a Graphics Processing Unit (GPU)-based human body microwave echo simulation method and system and seek to solve the aforementioned problem that, in a human body three-dimensional scanning and imaging system, the echo has a high dimension, and the system has a lot of channels, which cause heavy computing burden and high complexity in echo simulation; as a result simulation echoes usually cannot be computed and generated in real time by existing conventional computers or CPU of a workstation.

The present disclosure is implemented as follow. A GPU-based human body microwave echo simulation method includes:

transmitting emulation input parameters from the memory of a CPU host into the display memory of a GPU device;

configuring, at the CPU host, parallel computing network parameters to be run at the GPU device;

initiating a kernel function for human body microwave echo simulation preset in the CPU host;

computing the kernel function in parallel, in a plurality of processing kernels of the GPU device, in a multi-threaded manner, according to the parallel computing network parameters, to obtain simulation echoes of human body microwaves;

transmitting the obtained simulation echoes of human body microwaves from the GPU device back to the CPU host.

Another objective of the present disclosure is to provide a GPU-based human body microwave echo simulation system, which includes a CPU host and a GPU device, the CPU host includes an emulation parameter transmitting unit, a parallel parameter configuring unit, and a kernel function initiating unit, and the GPU device includes a parallel computing unit and an echo data transmitting unit, wherein:

the emulation parameter transmitting unit is configured to transmit emulation input parameters from the memory of the CPU host into the display memory of the GPU device;

the parallel parameter configuring unit is configured to configure, at the CPU host, parallel computing network parameters to be run at the GPU device;

the kernel function initiating unit is configured to initiate a kernel function for human body microwave echo simulation preset in the CPU host;

the parallel computing unit is configured to compute the kernel function in parallel, in a plurality of processing kernels of the GPU device, in a multi-threaded manner, according to the parallel computing network parameters, to obtain simulation echoes of human body microwaves;

the echo data transmitting unit is configured to transmit the obtained simulation echoes of human body microwaves from the GPU device back to the CPU host.

The GPU-based human body microwave echo simulation method and system according to the embodiments of this invention has the following technical effects.

The invention employs the following technical measures: transmitting emulation input parameters from the memory of a CPU host into the display memory of a GPU device; configuring, at the CPU host, parallel computing network parameters to be run at the GPU device; initiating a kernel function for human body microwave echo simulation preset in the CPU host; the kernel function computing simulation echoes of human body microwaves in parallel, in a plurality of processing kernels of the GPU device, in a multi-threaded manner, according to the parallel computing network parameters; and the GPU device transmitting the obtained simulation echoes of human body microwaves back to the CPU host. As such, the present solution can make full use of the characteristic that a GPU can perform parallel computing to accelerate the echo simulation process, greatly improving the real-time performance of echo simulation of a human body microwave scanning and imaging system.

DETAILED DESCRIPTION

In order to make the objectives, the technical solutions and the advantages clearer, the present disclosure will be described fully below referring to the accompanying drawings and the embodiments. It should be understood that, specific embodiments described herein merely used to explain this invention, and cannot be construed as a limit.

The embodiments of this invention aim to achieve human microwave three-dimensional echo simulation with respect to a near-distance human body scanning and imaging security inspect system. The near-distance human body scanning and imaging security inspect system can be a plane scanning system or a cylinder scanning system according to the scanning surface formed in the phase center of a transmitting and receiving antenna unit. The embodiments of this invention are mainly for cylinder scanning geometry, and the echo simulation method provided in this invention also can be used for plane scanning geometry.

Figure 1:
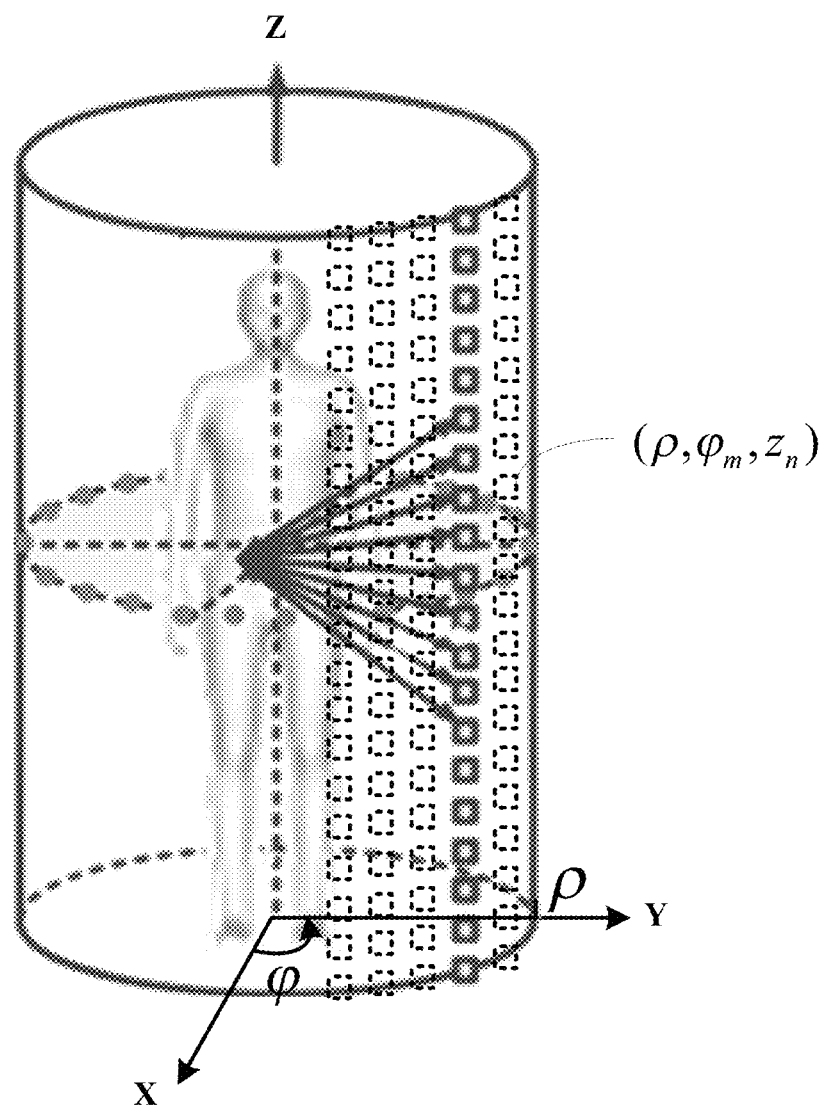
FIG. 1 illustrates a geometry diagram of cylinder scanning for a human body three-dimensional scanning and imaging security inspect system according to an embodiment of this invention.

FIG. 1 illustrates a geometry diagram of cylinder scanning for a human body three-dimensional scanning and imaging security inspect system according to an embodiment of this invention. As illustrated in FIG. 1, transmitting and receiving antenna units form a linear array in a vertical height Z direction, and the distance to a cylinder scanning assembly central axis is $\rho$. Meanwhile, the linear array is rotationally scanned, and finally equivalently forms a plurality of antenna equivalent phase centers with equal antifake interval and equal altitude coordinate distributed in the cylinder surface. Cylindrical coordinates $(\rho, \varphi_m, z_n)$ refer to the position of an antenna phase center, wherein $\varphi_m$ represents the azimuthal angle coordinate value of the $m^{th}$ azimuthal angle directional sampling point under azimuthal angle direction's uniformly-space sampling, and the range of m is $0 \leq m \leq M-1$, wherein M represents the total points of the antenna phase center scanning in the direction of the azimuthal angle; $z_n$ represents the height coordinate value of the nth height directional sampling point under height direction's uniformly-space sampling, and the range of n is $0 \leq n \leq N-1$, wherein N represents the total points of the antenna phase center scanning in the height direction. The human microwave three-dimensional echo simulation refers to computing the echo data of all antenna phase centers $(\rho, \varphi_m, z_n)$ by means of data simulation.

The echo simulation method according to an embodiment of this invention is implemented based on GPU. As such, before the details of the embodiment of this invention are described, some concepts and stages about parallel computation by GPU are briefly introduced.

Figure 2:
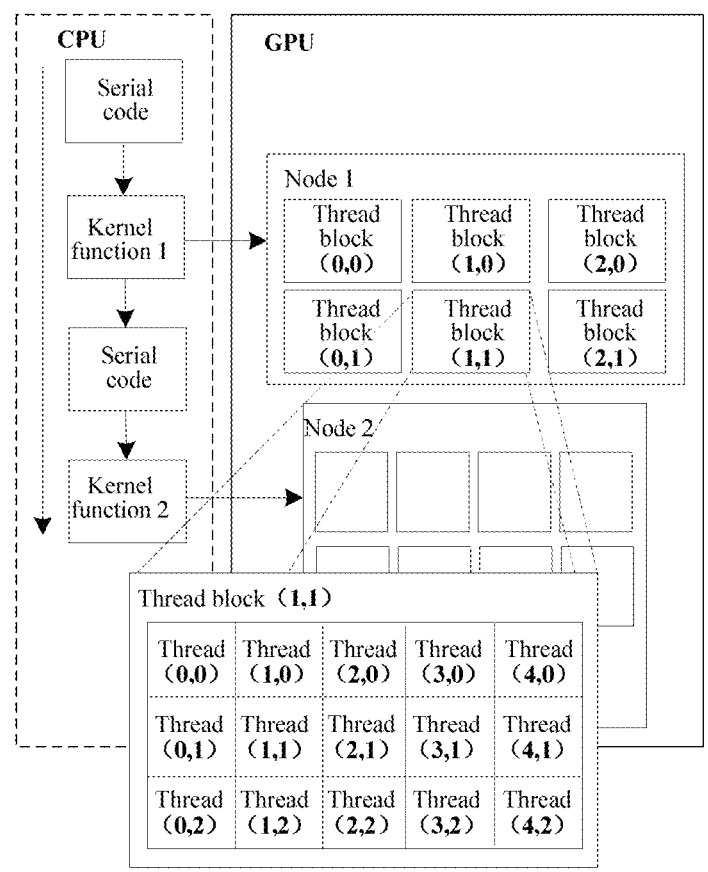
FIG. 2 illustrates an architecture diagram of implementing parallel computation by GPU in a GPU-based human body microwave echo simulation method according to an embodiment of this invention.

GPU refers to integrating massive computing units in a limited board card and is mainly responsible for computing tasks with high computational density. Compared with CPU in conventional computer or workstation, GPU has stronger floating-point calculation capability and greater bandwidth. Generally, GPU plays a role as a host, while GPU as a device assisting processing, so that GPU can be used to run some programs that can be highly threaded. FIG. 2 illustrates an architecture diagram of implementing parallel accelerated computation by GPU, and highly threaded programs form a so-called kernel function, which is implemented in parallel in a GPU. The kernel function is run in a computation core of CPU in the organization manner of thread blocks, and each thread block includes a plurality of threads executed in parallel. In actual operation, parallel computation network parameters should be set according to the requirements of parallel optimization, and the parallel computing network parameters include the dimensionality of thread blocks for the GPU device's parallel computing and the dimensionality of threads in a thread block.

Figure 3:
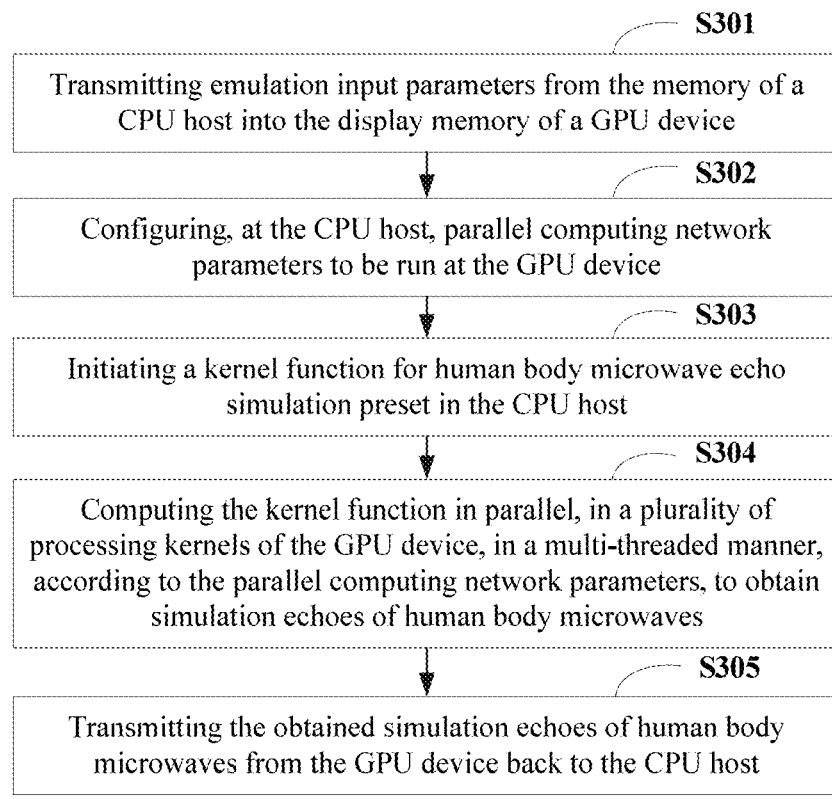
FIG. 3 illustrates a schematic flow chart of a GPU-based human body microwave echo simulation method according to an embodiment of this invention.

FIG. 3 illustrates a schematic flow chart of a GPU-based human body microwave echo simulation method according to an embodiment of this invention. As illustrated in FIG. 3, the method can include the following stages:

Stage S301, transmitting emulation input parameters from the memory of a CPU host into the display memory of a GPU device.

In this embodiment, the emulation input parameters include: scanning parameters of a human body scanning and imaging system, an antenna phase center position parameter, and a distributed target parameter for a human body model.

The scanning parameters of a human body scanning and imaging system include a transmitting pulse signal's center frequency $f_c$, pulse width $T_s$, bandwidth B, and echo sampling frequency $f_s$.

The antenna phase center position parameter is $(\rho, \varphi_m, z_n)$, wherein $\rho$ represents the distance from the antenna phase center of the human body microwave security inspection system to a cylinder central axis in cylinder scanning geometry, $\varphi_m$ represents the azimuthal angle coordinate value of the mth azimuthal angle directional sampling point under azimuthal angle direction's uniformly-space sampling, and the range of m is $0 \leq m \leq M-1$, wherein M represents the total points of the antenna phase center scanning in the direction of the azimuthal angle; $z_n$ represents the height coordinate value of the nth height directional sampling point under height direction's uniformly-space sampling, and the range of n is $0 \leq n \leq N-1$, wherein N represents the total points of the antenna phase center scanning in the height direction.

For the distributed target parameter $\delta(\rho_k, \varphi_k, z_k)$ for a human body model, $(\rho_k, \varphi_k, z_k)$ represents the coordinates of distance, azimuthal angle, and height of the kth scattering point of the human body model, and $\delta(\rho_k, \varphi_k, z_l))$ represents the scattering coefficient of the kth scattering point of the human body model. The range of k is $0 \leq k \leq K-1$, wherein K represents the total number of scattering points in the human body model distributed target.

Stage S302, configuring, at the CPU host, parallel computing network parameters to be run at the GPU device.

In this embodiment, the parallel computing network parameters include the dimensionality of thread blocks for the parallel computing of the GPU device and the dimensionality of threads in a thread block.

Preferably, the dimensionality of thread blocks is M×N, wherein M represents the total points of the antenna phase center scanning in the direction of the azimuthal angle and N represents the total points of the antenna phase center scanning in the height direction. The dimensionality of thread blocks is K×1, wherein K represents the total number of scattering points in the human body model distributed target.

Stage S303, initiating a kernel function for human body microwave echo simulation preset in the CPU host.

Stage S304, computing the kernel function in parallel, in a plurality of processing kernels of the GPU device, in a multi-threaded manner, according to the parallel computing network parameters, to obtain simulation echoes of human body microwaves.

Figure 4:
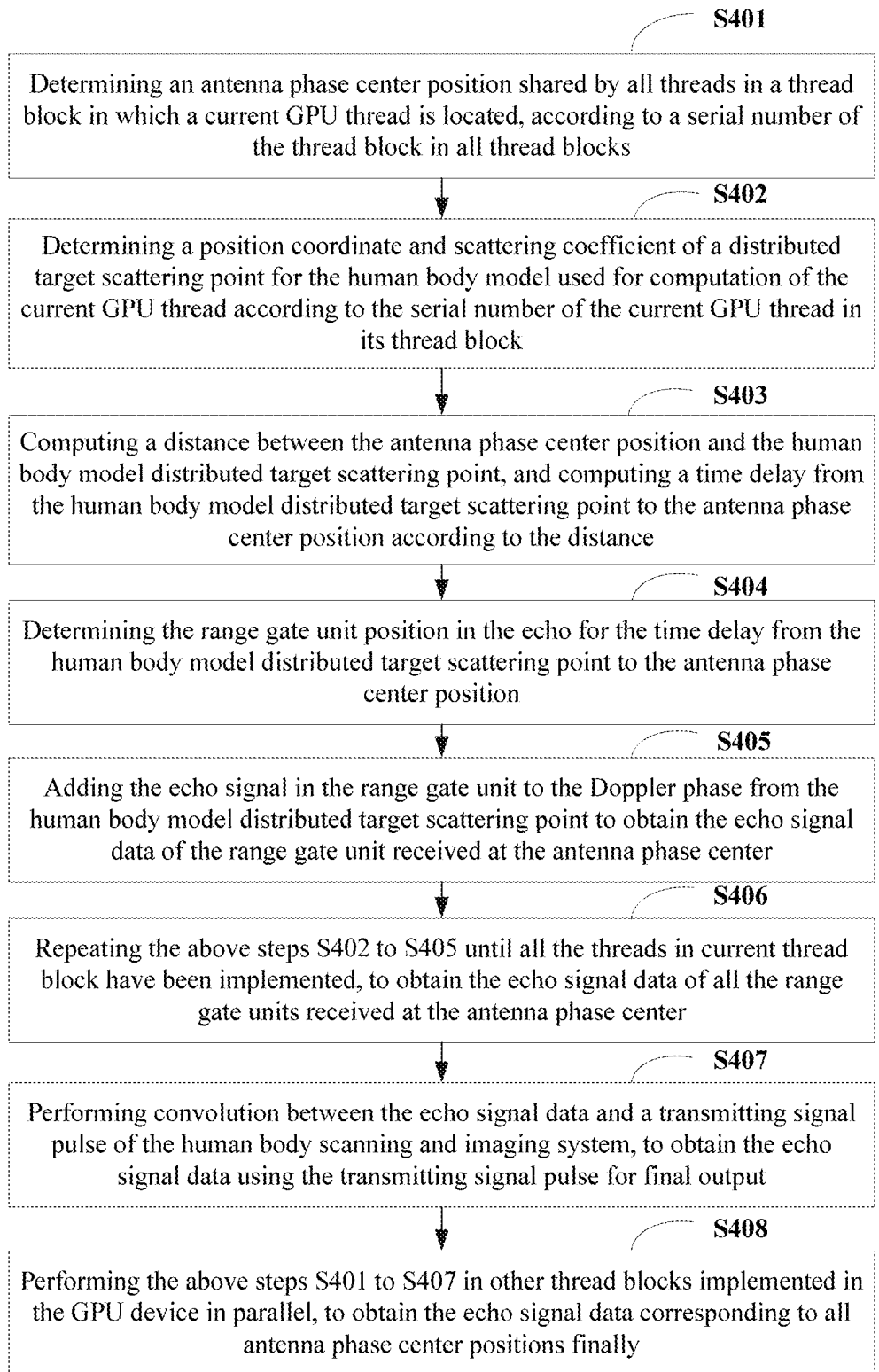
FIG. 4 illustrates a schematic flow chart of stage S304 in a GPU-based human body microwave echo simulation method according to an embodiment of this invention.

FIG. 4 illustrates the specific realization process of stage S304. As illustrated in FIG. 4, the specific realization process of stage S304 is as follow.

Stage S401, determining an antenna phase center position shared by all threads in a thread block in which a current GPU thread is located, according to a serial number of the thread block in all thread blocks.

The serial number of the thread block of a current GPU thread in all thread blocks is set as (m', n'), and the antenna phase center position shared by all threads in the thread block is determined as $(\rho, \varphi_{m'}, z_{n'})$, wherein $\rho$ represents the distance from the antenna phase center of the human body microwave security inspection system to a cylinder central axis in cylinder scanning geometry, $\varphi_{m'}$ represents the azimuthal angle coordinate value of the m'th azimuthal angle directional sampling point under azimuthal angle direction's uniformly-space sampling, and the range of m' is $0 \leq m' \leq M-1$, wherein M represents the total points of the antenna phase center scanning in the direction of the azimuthal angle; $z_{n'}$ represents the height coordinate value of the n'th height directional sampling point under height direction's uniformly-space sampling, and the range of n' is $0 \leq n' \leq N-1$, wherein N represents the total points of the antenna phase center scanning in the height direction.

Stage S402, determining a position coordinate and scattering coefficient of a distributed target scattering point for the human body model used for computation of the current GPU thread according to the serial number of the current GPU thread in its thread block.

In this embodiment, the serial number of a current GPU thread in its thread block is set as k', the position coordinate of the k'th distributed target scattering point for a human body model used in current GPU thread computation is determined as $(\rho_{k'}, \varphi_{k'}, z_{k'})$, and the scattering coefficient is $\delta(\rho_{k'}, \varphi_{k'}, z_{k'})$, wherein the range of k' is $0 \leq k' \leq K-1$, and K represents the total number of scattering points in the human body model distributed target.

Stage S403, computing a distance between the antenna phase center position and the human body model distributed target scattering point, and computing a time delay from the human body model distributed target scattering point to the antenna phase center position according to the distance.

In this embodiment, the distance between the antenna phase center position $(\rho, \varphi_{m'}, _{n'})$ and the k'th scattering point $(\rho_{k'}, \varphi_{k'}, z_{k'})$ is R, and the time delay from the target scattering point to the antenna phase center position is $\tau_d$, then $\tau_d = 2R/c$, wherein c is electromagnetic wave's propagation velocity in vacuo.

Stage S404, determining the range gate unit position in the echo for the time delay from the human body model distributed target scattering point to the antenna phase center position.

In this embodiment, the range gate unit position in the echo for the time delay $\tau_d$ from the k'th target scattering point to the antenna phase center position is $\lceil \tau_d \times f_s \rceil + 0.5$, wherein $f_s$ is the echo sampling frequency, and $\lceil \ \rceil$ is a down round operator.

Stage S405, adding the echo signal in the range gate unit to the Doppler phase from the human body model distributed target scattering point to obtain the echo signal data of the range gate unit received at the antenna phase center.

In this embodiment, the echo signal data of the range gate unit received at the antenna phase center at $(\rho, \varphi_{m'}, z_{n'})$ is set as $s_r(\varphi_{m'}, z_{n'}, t)$, then:

$$s_r(\varphi_{m'}, z_{n'}, t) = s_r(\varphi_{m'}, z_{n'}, t) + \sigma(\rho_{k'}, \varphi_{k'}, z_{k'}) \times \exp(-j2\pi f_c \tau_d)$$

Stage S406, repeating the above stages S402 to S405 until all the threads in current thread block have been implemented, to obtain the echo signal data of all the range gate units received at the antenna phase center.

In this embodiment, the above stages S402 to S405 are repeated until all the threads in current thread block have been implemented, and the echo signal data $s_r(\varphi_{m'}, z_{n'}, t)$ of all the range gate units received at the antenna phase center at $(\rho, \varphi_{m'}, z_{n'})$ is obtained.

Stage S407, performing convolution between the echo signal data and a transmitting signal pulse of the human body scanning and imaging system, to obtain the echo signal data using the transmitting signal pulse for final output.

In this embodiment, the transmitting signal pulse of the human body scanning and imaging system is a linear frequency modulation signal pulse, which is expressed as:

$$s(t) = rect\left(\frac{t}{T_s}\right) \times \exp\left(j2\pi f_c t + j\pi \frac{B}{T_s} t^2\right), t \in [0, T_s]$$

wherein t represents a time coordinate, and $f_c$, $T_s$, and B respectively represent the center frequency, the pulse width, and the bandwidth of the emulation input human body microwave, three-dimensional imaging security inspection system.

Stage S408, performing the above stages S401 to S407 in other thread blocks implemented in the GPU device in parallel, to obtain the echo signal data corresponding to all antenna phase center positions finally.

In this embodiment, the above stages S401 to S407 are performed in parallel in other thread blocks of the GPU device to obtain the echo signal data $s_r(\varphi_m, z_n, t)$ corresponding to all antenna phase center positions $(\rho, \varphi_m, _n)$, wherein $0 \leq m \leq M-1$; $0 \leq n \leq N-1$.

Stage S305, transmitting the obtained simulation echoes of human body microwaves from the GPU device back to the CPU host.

In this embodiment, after receiving the simulation echoes of human body microwaves, the CPU host transmits the simulation echoes to subsequent imaging processing procedures or stores simulation echo data in a hard disk according to the requirements of storage format and path.

In view of the above, the GPU-based human body microwave echo simulation method provided by the embodiment employs the following technical measures: transmitting emulation input parameters from the memory of a CPU host into the display memory of a GPU device; configuring, at the CPU host, parallel computing network parameters to be run at the GPU device; initiating a kernel function for human body microwave echo simulation preset in the CPU host; the kernel function computing simulation echoes of human body microwaves in parallel, in a plurality of processing kernels of the GPU device, in a multi-threaded manner, according to the parallel computing network parameters; and the GPU device transmitting the obtained simulation echoes of human body microwaves back to the CPU host. As such, the present solution can make full use of the characteristic that a GPU can perform parallel computing to accelerate the echo simulation process, greatly improving the real-time performance of echo simulation of a human body microwave scanning and imaging system. Besides, since CPU is replaced with GPU to perform echo simulation, CPU resource can be saved for the functions of system control, resource scheduling, and logical analysis. In addition, when performing echo simulation, emulation parameters can be changed according to requirements, to make the whole echo simulation procedure to be convenient and easy, facilitating improving the efficiency of system development and debugging and lowering the cost.

Figure 5:
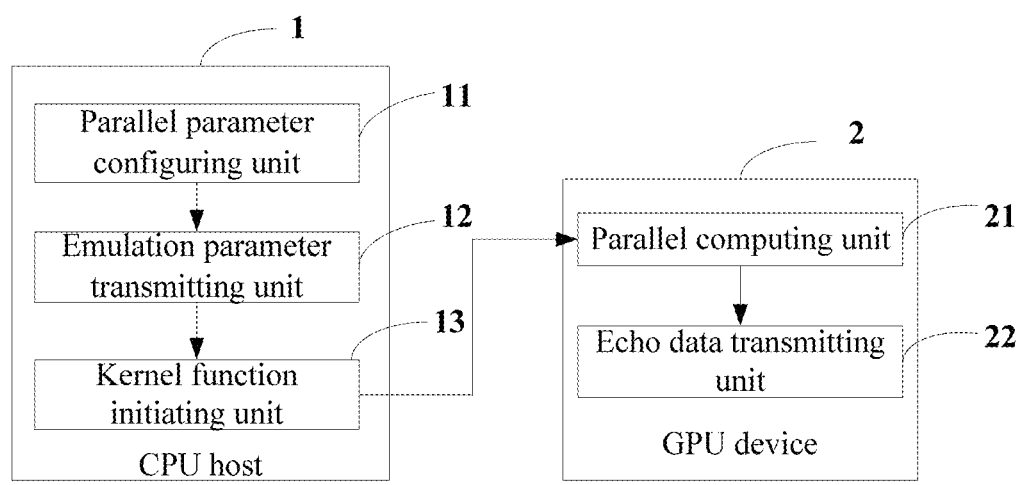
FIG. 5 illustrates a schematic block diagram of a GPU-based human body microwave echo simulation system according to an embodiment of this invention.

FIG. 5 illustrates a schematic block diagram of a GPU-based human body microwave echo simulation system according to an embodiment of this invention, and the system is used for running the method provided by the embodiments shown in FIG. 3 and FIG. 4 of this invention. For illustration purposes, the following merely shows the parts related to this embodiment.

As illustrated in FIG. 5, a GPU-based human body microwave echo simulation system provided by this embodiment includes a CPU host 1 and a GPU device 2, the CPU host 1 includes an emulation parameter transmitting unit 12, a parallel parameter configuring unit 11, and a kernel function initiating unit 13, and the GPU device 2 includes a parallel computing unit 21 and an echo data transmitting unit 22, wherein:

the emulation parameter transmitting unit 12 is configured to transmit emulation input parameters from the memory of the CPU host 1 into the display memory of the GPU device 2;

the parallel parameter configuring unit 11 is configured to configure, at the CPU host 1, parallel computing network parameters to be run at the GPU device 2;

the kernel function initiating unit 13 is configured to initiate a kernel function for human body microwave echo simulation preset in the CPU host 1;

the parallel computing unit 21 is configured to compute the kernel function in parallel, in a plurality of processing kernels of the GPU device 2, in a multi-threaded manner, according to the parallel computing network parameters, to obtain simulation echoes of human body microwaves;

the echo data transmitting unit 22 is configured to transmit the obtained simulation echoes of human body microwaves from the GPU device 2 back to the CPU host 1.

Optionally, the emulation input parameters include: scanning parameters of a human body scanning and imaging system, an antenna phase center position parameter, and a distributed target parameter for a human body model.

Optionally, the parallel computing network parameters include the dimensionality of thread blocks for the parallel computing of the GPU device 2 and the dimensionality of threads in a thread block.

Optionally, the parallel computing unit 21 is specifically configured to:

determine an antenna phase center position shared by all threads in a thread block in which a current GPU thread is located, according to a serial number of the thread block in all thread blocks;

determine a position coordinate and scattering coefficient of a distributed target scattering point for the human body model used for computation of the current GPU thread according to a serial number of the current GPU thread in the thread block;

compute a distance between the antenna phase center position and the distributed target scattering point for the human body model, and compute a time delay from the distributed target scattering point for the human body model to the antenna phase center position according to the distance;

determine a position of a range gate unit in the echo for the time delay from the distributed target scattering point for the human body model to the antenna phase center position;

add a echo signal in the range gate unit to a Doppler phase from the distributed target scattering point for the human body model to obtain echo signal data of the range gate unit received at the antenna phase center;

return to the stage of determining a position coordinate and scattering coefficient of a distributed target scattering point for the human body model used for computation of the current GPU thread according to a serial number of the current GPU thread in the thread block, and repeat the above procedure until all the threads in the current thread block are processed, to obtain echo signal data of all the range gate units received at the antenna phase center;

perform convolution between the echo signal data and a transmitting signal pulse of the human body scanning and imaging system, to obtain the echo signal data using the transmitting signal pulse for final output;

perform the above procedure in other thread blocks implemented in the GPU device 2 in parallel, to obtain the echo signal data corresponding to all antenna phase center positions finally.

Optionally, the transmitting signal pulse of the human body scanning and imaging system is a linear frequency modulation signal pulse.

It should be noted that, because each unit in the system provided by this embodiment has the same inventive concept as that of the method embodiment, the technical effect is also the same as that of the method embodiment, and the specific contents can be found in the descriptions about the method embodiment of this invention, and hence not repeat here.

Therefore, the GPU-based human body microwave echo simulation system provided by the embodiment also can make full use of the characteristic that a GPU can perform parallel computing to accelerate the echo simulation process, greatly improving the real-time performance of echo simulation of a human body microwave scanning and imaging system. Besides, since CPU is replaced with GPU to perform echo simulation, CPU resource can be saved for the functions of system control, resource scheduling, and logical analysis. In addition, when performing echo simulation, emulation parameters can be changed according to requirements, to make the whole echo simulation procedure to be convenient and easy, facilitating improving the efficiency of system development and debugging and lowering the cost.

The above are merely example embodiments of this invention, which should not be construed as a limit to this invention. Any amendment, alternative and modification made within the spirit and principle of this invention belongs to the scope of this invention.

What is claimed is:

1. A GPU-based human body microwave echo simulation method, comprising:

transmitting emulation input parameters from a memory of a CPU host into a display memory of a GPU device;

configuring, at the CPU host, parallel computing network parameters to be run at the GPU device;

initiating computation of a kernel function for human body microwave echo simulation preset in the CPU host;

computing the kernel function in parallel, in a plurality of processing kernels of the GPU device, in a multi-threaded manner, according to the parallel computing network parameters, to obtain simulation echoes of human body microwaves; and transmitting the obtained simulation echoes of human body microwaves from the GPU device back to the CPU host;

wherein the step of computing the kernel function in parallel, in a plurality of processing kernels of the GPU device, in a multi-threaded manner, according to the parallel computing network parameters, to obtain simulation echoes of human body microwaves comprises:

determining an antenna phase center position shared by all threads in a thread block in which a current GPU thread is located, according to a serial number of the thread block in all thread blocks;

determining a position coordinate and scattering coefficient of a distributed target scattering point for the human body model used for computation of the current GPU thread according to a serial number of the current GPU thread in the thread block;

computing a distance between the antenna phase center position and the distributed target scattering point for the human body model, and computing a time delay from the distributed target scattering point for the human body model to the antenna phase center position according to the distance;

determining a position of a range gate unit in the echo for the time delay from the distributed target scattering point for the human body model to the antenna phase center position;

adding a echo signal in the range gate unit to a Doppler phase from the distributed target scattering point for the human body model to obtain echo signal data of the range gate unit received at the antenna phase center;

returning to the step of determining a position coordinate and scattering coefficient of a distributed target scattering point for the human body model used for computation of the current GPU thread according to a serial number of the current GPU thread in the thread block, and repeating the above procedure until all the threads in the current thread block are processed, to obtain echo signal data of all the range gate units received at the antenna phase center;

performing convolution on the echo signal data and a transmitting signal pulse of the human body scanning and imaging system, to obtain echo signal data from the transmitting signal pulse for final output; and performing the above procedure in other thread blocks implemented in the GPU device in parallel, to obtain echo signal data corresponding to all antenna phase center positions.

2. The method of claim 1, wherein the emulation input parameters comprise: scanning parameters of a human body scanning and imaging system, an antenna phase center position parameter, and a distributed target parameter for a human body model.

3. The method of claim 2, wherein the parallel computing network parameters comprise a dimensionality of thread blocks for parallel computing of the GPU device and a dimensionality of threads in a thread block.

4. The method of claim 1, wherein the transmitting signal pulse of the human body scanning and imaging system is a linear frequency modulation signal pulse.

5. A GPU-based human body microwave echo simulation system comprising:

at least one processor; and a memory storing instructions, which when executed by the at least one processor, cause the at least one processor to perform operations, the operations comprising:

transmitting emulation input parameters from a memory of a CPU host into a display memory of a GPU device;

configuring, at the CPU host, parallel computing network parameters to be run at the GPU device;

initiating computation of a kernel function for human body microwave echo simulation preset in the CPU host;

computing the kernel function in parallel, in a plurality of processing kernels of the GPU device, in a multi-threaded manner, according to the parallel computing network parameters, to obtain simulation echoes of human body microwaves; and transmitting the obtained simulation echoes of human body microwaves from the GPU device back to the CPU host wherein the step of computing the kernel function in parallel, in a plurality of processing kernels of the GPU device, in a multi-threaded manner, according to the parallel computing network parameters, to obtain simulation echoes of human body microwaves comprises:

determining an antenna phase center position shared by all threads in a thread block in which a current GPU thread is located, according to a serial number of the thread block in all thread blocks;

determining a position coordinate and scattering coefficient of a distributed target scattering point for the human body model used for computation of the current GPU thread according to a serial number of the current GPU thread in the thread block;

computing a distance between the antenna phase center position and the distributed target scattering point for the human body model, and computing a time delay from the distributed target scattering point for the human body model to the antenna phase center position according to the distance;

determining a position of a range gate unit in the echo for the time delay from the distributed target scattering point for the human body model to the antenna phase center position;

adding a echo signal in the range gate unit to a Doppler phase from the distributed target scattering point for the human body model to obtain echo signal data of the range gate unit received at the antenna phase center;

returning to the step of determining a position coordinate and scattering coefficient of a distributed target scattering point for the human body model used for computation of the current GPU thread according to a serial number of the current GPU thread in the thread block, and repeating the above procedure until all the threads in the current thread block are processed, to obtain echo signal data of all the range gate units received at the antenna phase center;

performing convolution on the echo signal data and a transmitting signal pulse of the human body scanning and imaging system, to obtain echo signal data from the transmitting signal pulse for final output; and performing the above procedure in other thread blocks implemented in the GPU device in parallel, to obtain echo signal data corresponding to all antenna phase center positions.

6. The system of claim 5, wherein the emulation input parameters comprise: scanning parameters of a human body scanning and imaging system, an antenna phase center position parameter, and a distributed target parameter for a human body model.

7. The system of claim 6, wherein the parallel computing network parameters comprise a dimensionality of thread blocks for parallel computing of the GPU device and a dimensionality of threads in a thread block.

8. The system of claim 5, wherein the transmitting signal pulse of the human body scanning and imaging system is a linear frequency modulation signal pulse.

9. A non-transitory computer storage medium storing a computer program, which when executed by one or more processors, causes the one or more processors to perform operations, the operations comprising:

transmitting emulation input parameters from a memory of a CPU host into a display memory of a GPU device;

configuring, at the CPU host, parallel computing network parameters to be run at the GPU device;

initiating computation of a kernel function for human body microwave echo simulation preset in the CPU host;

computing the kernel function in parallel, in a plurality of processing kernels of the GPU device, in a multi-threaded manner, according to the parallel computing network parameters, to obtain simulation echoes of human body microwaves; and transmitting the obtained simulation echoes of human body microwaves from the GPU device back to the CPU host wherein the step of computing the kernel function in parallel, in a plurality of processing kernels of the GPU device, in a multi-threaded manner, according to the parallel computing network parameters, to obtain simulation echoes of human body microwaves comprises:

determining an antenna phase center position shared by all threads in a thread block in which a current GPU thread is located, according to a serial number of the thread block in all thread blocks;

determining a position coordinate and scattering coefficient of a distributed target scattering point for the human body model used for computation of the current GPU thread according to a serial number of the current GPU thread in the thread block;

computing a distance between the antenna phase center position and the distributed target scattering point for the human body model, and computing a time delay from the distributed target scattering point for the human body model to the antenna phase center position according to the distance;

determining a position of a range gate unit in the echo for the time delay from the distributed target scattering point for the human body model to the antenna phase center position;

adding a echo signal in the range gate unit to a Doppler phase from the distributed target scattering point for the human body model to obtain echo signal data of the range gate unit received at the antenna phase center;

returning to the step of determining a position coordinate and scattering coefficient of a distributed target scattering point for the human body model used for computation of the current GPU thread according to a serial number of the current GPU thread in the thread block, and repeating the above procedure until all the threads in the current thread block are processed, to obtain echo signal data of all the range gate units received at the antenna phase center;

performing convolution on the echo signal data and a transmitting signal pulse of the human body scanning and imaging system, to obtain echo signal data from the transmitting signal pulse for final output; and performing the above procedure in other thread blocks implemented in the GPU device in parallel, to obtain echo signal data corresponding to all antenna phase center positions.

10. The non-transitory computer storage medium of claim 9, wherein the emulation input parameters comprise: scanning parameters of a human body scanning and imaging system, an antenna phase center position parameter, and a distributed target parameter for a human body model.

11. The non-transitory computer storage medium of claim 10, wherein the parallel computing network parameters comprise a dimensionality of thread blocks for parallel computing of the GPU device and a dimensionality of threads in a thread block.

12. The non-transitory computer storage medium of claim 9, wherein the transmitting signal pulse of the human body scanning and imaging system is a linear frequency modulation signal pulse.

* * * * *